Sept. 14, 1937.  J. GALBRAITH  2,093,009
CARVING MACHINE
Filed May 6, 1935  4 Sheets-Sheet 3

INVENTOR
JOHN GALBRAITH
BY Paul, Paul & Moore
ATTORNEYS

Patented Sept. 14, 1937

2,093,009

UNITED STATES PATENT OFFICE 2,093,009

CARVING MACHINE

John Galbraith, Minneapolis, Minn.

Application May 6, 1935, Serial No. 20,041

17 Claims. (Cl. 90—13.2)

This invention relates to new and useful improvements in carving machines.

An object of the invention is to provide a novel belt drive for the spindles of a wood carving machine, comprising means for maintaining the belt at a uniform tension, regardless of the swinging movements of the spindles and their supports, without the use of additional pulleys for thus maintaining the belt taut, whereby vibration is reduced to a minimum, which is highly desirable in machines of this character.

A further object is to provide in a wood carving machine comprising a carriage having a plurality of spindles mounted thereon and arranged in groups, and each of said groups comprising a belt and a drive pulley, said drive pulleys being mounted upon suitable supports adapted for swinging movement about vertical axes, and said swinging supports being operatively connected together by suitable tension means, whereby the tension in the belts of said groups of spindles is equalized.

A further object is to provide a wood carving machine comprising a plurality of spindles mounted for swinging movement in a direction lengthwise of the machine and each comprising a suitable pulley, and a drive belt having a running connection with said pulleys and with a drive pulley secured directly to the shaft of a motor, mounted upon a suitable support adapted for swinging movement about a vertical axis and constantly urged in a direction to maintain the belt taut.

A further object is to provide a wood carving machine comprising a carriage mounted for traveling movement and having a wheel at each end adapted to travel upon suitable tracks, and a drum being secured to each wheel and having oppositely disposed metallic bands operatively connected thereto and each having one end connected to the machine frame, at opposite sides thereof, and in such manner that when the carriage is moved backwardly and forwardly upon the tracks, the bands are wound upon the drums in opposite directions and in single layers or convolutions, whereby the bands are maintained taut at all times without additional means for compensating for variations in the length thereof, as when the bands are allowed to overlap on the peripheries of the drums, and whereby the axis or longitudinal centerline of the carriage is maintained in parallel relation to the longitudinal centerline of the machine at all times.

A further object is to provide a wood carving machine having a carriage mounted for traveling movement thereon and having a supporting wheel at each end, and a suitable housing enclosing each wheel and having means at their lower portions for wipingly engaging the tops of the tracks, thereby to maintain the wheel-engaging surfaces of the tracks clean to assure smooth operation of the carriage.

A further object is to provide a wood carving machine comprising a carriage having a plurality of spindles mounted thereon and arranged in groups, and a reversing mechanism being interposed between said groups of spindles whereby they may be operated in opposite directions lengthwise of the carriage, thereby to facilitate the operation of carving right and left hand objects, said reversing mechanism being supported entirely upon the carriage proper and having operative connections with the outer ends of the usual arms for supporting the cutter bar, or directly with the cutter bars, whereby the arms are relieved of excessive strains, and the machine rendered more accurate in operation.

Other objects reside in the provision of a wood carving machine having its various mechanisms so arranged as to provide a machine which is simple and convenient to operate, and whose carriage and moving parts are extremely light in weight, whereby the cutter bar may readily be operated for long periods without fatiguing the operator; in the unique arrangement of the metallic bands for positively maintaining the carriage parallel to the centerline of the machine; in the simple means provided for rendering the reversing mechanism operative or inoperative; and, in the unique construction of the work-supporting centers of the machine wherein the drive means for the live centers at the rear of the machine are self-lubricating, and each dead center is provided with a removable cup-shaped point or terminal which is detachably secured in the end of the supporting spindle of the center, whereby said terminal may readily be removed for repairs when necessary; and, in the means provided in connection with the dead centers, whereby they are rendered self-alining when a piece of work is supported thereby.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Frame

Figure 1:
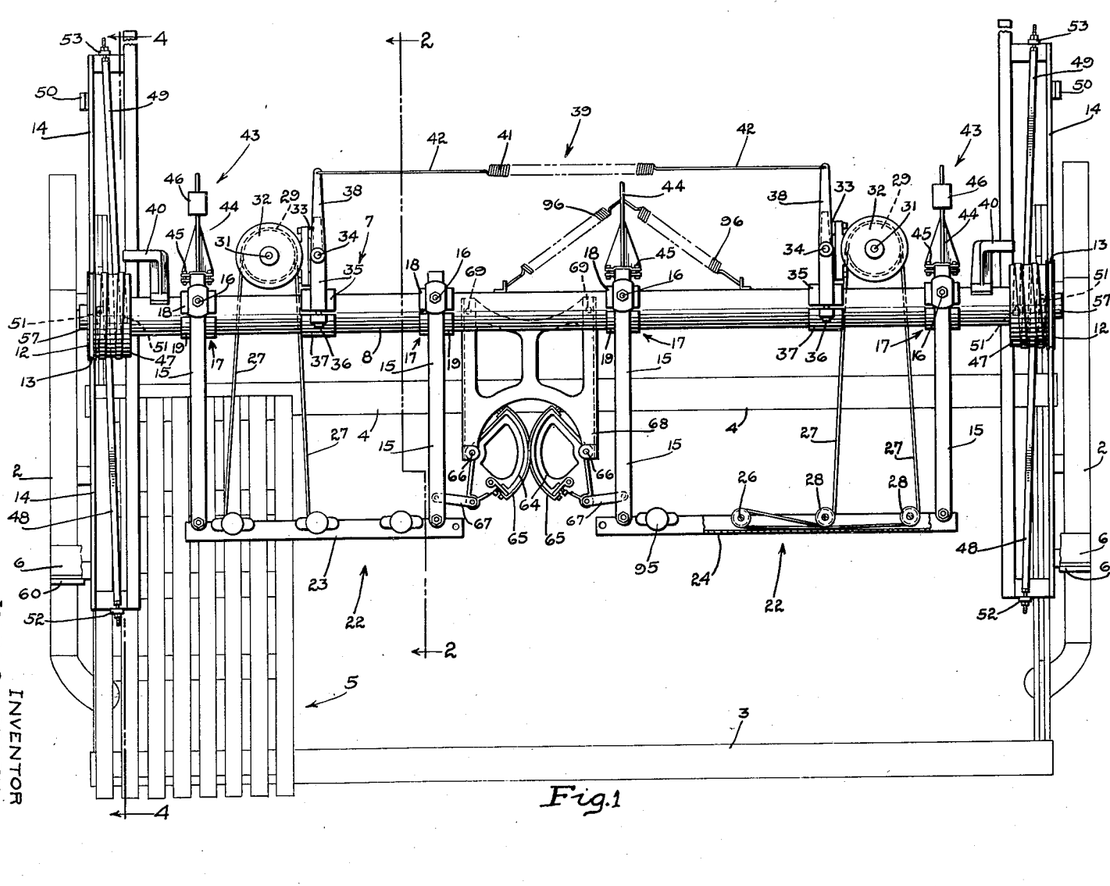
Figure 1 is a plan view showing a portion of a wood carving machine with the invention embodied in the construction thereof.
Figures 2, 4, 8, 9:
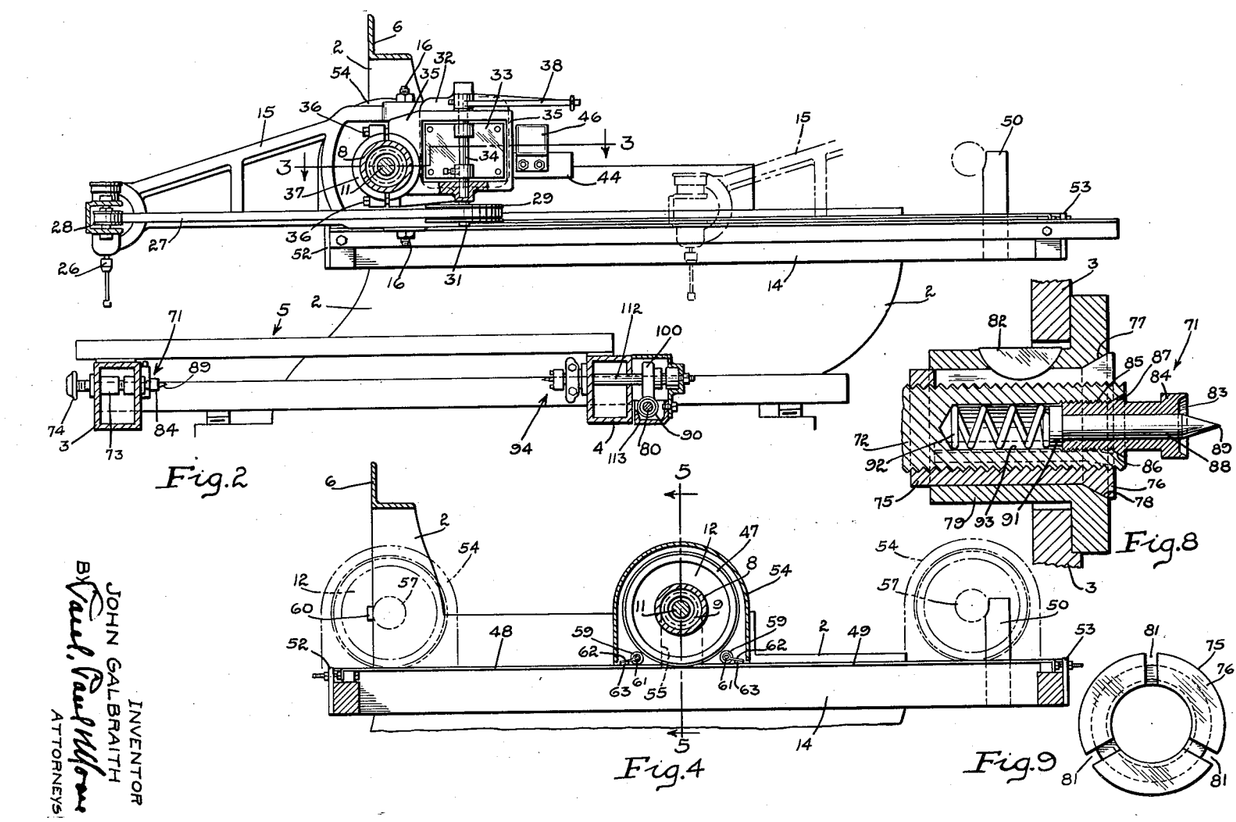
Figure 2 is a detail sectional view on the line 2—2 of Figure 1, showing the unique mounting of the motor on the carriage.
Figure 4 is a detail sectional view substantially on the line 4—4 of Figure 1, showing one of the housings for enclosing the carriage supporting wheels, and the means for cleaning the upper surfaces of the tracks, upon which the wheels roll.
Figure 8 is an enlarged detail sectional view showing one of the work-supporting centers.
Figure 9 is an end view of the spindle sleeve.

In the selected embodiment of the invention here shown, there is illustrated in Figures 1 and 2, a portion of the frame of a wood carving machine comprising side frame members 2—2, suitably connected together by longitudinally extending rails 3 and 4, as shown in Figure 2. The rails 3 and 4 support the usual table top, generally indicated by the numeral 5. The upper portions of the side frames 2 are shown connected together by an upper rail 6.

Carriage

The carriage, generally indicated by the numeral 7, is shown comprising a tubular member 8 extending from end to end of the machine, as best shown in Figure 1. Suitable plugs 9 are secured in the ends thereof and are bored to receive suitable bearings, not shown in the drawings. A suitable shaft 11 extends lengthwise through the tubular member 8 and has suitable carrying wheels 12 secured to the ends thereof. The tubular member 8 is supported upon the shaft 11 by the bearings provided within the plugs 9. The wheels 12 have peripheral grooves 13 adapted to receive the upper edges of suitable tracks 14, mounted at the ends of the machine, as best shown in Figure 4.

Figures 3, 5, 6, 7, 10:
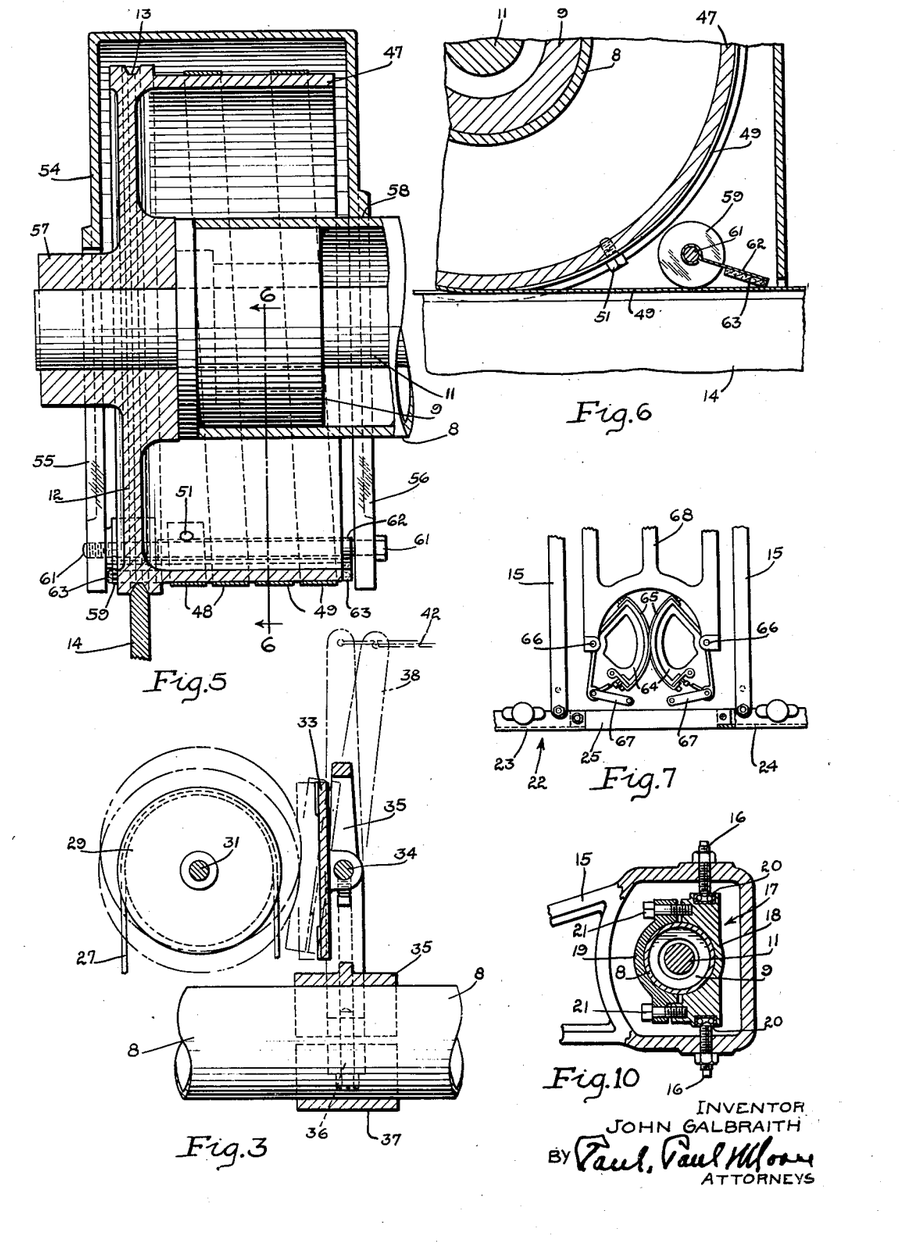
Figure 3 is an enlarged detail sectional view on the line 3—3 of Figure 2, showing the pivotal mounting of the motor.
Figure 5 is an enlarged detail sectional view on the line 5—5 of Figure 4, showing one of the carriage wheels and the parts associated directly therewith.
Figure 6 is a detail sectional view on the line 6—6 of Figure 5, showing one of the track cleaning elements.
Figure 7 is a detail sectional view showing the reversing mechanism disconnected from the cutter bars.
Figure 10 is a detail sectional view showing the novel means provided for pivotally supporting the arms upon the carriage.

A plurality of arms indicated by the numeral 15, are shown pivotally mounted upon the carriage 7, whereby they are adapted to swing in a horizontal plane about vertical pivots 16, provided in suitable brackets, generally indicated by the numeral 17. These brackets are in the form of split collars, and each comprises a member 18, shown having oppositely disposed bearings 20 therein adapted to receive the terminals of the pivots 16. A cap member 19 which cooperates with the member 18 to embrace the tubular member 8, as clearly illustrated in Figure 10, is secured to the member 18 by suitable bolts 21. By thus securing the brackets 17 to the tubular member 8, they may readily be accurately spaced apart lengthwise of the member 8, and they may also be rotatably adjusted thereon to accurately aline the arms on the carriage.

In Figure 1, the arms 15 are shown arranged in groups, and support a suitable cutter bar, generally indicated by the numeral 22. The cutter bar is preferably made in two sections 23 and 24, adapted to be connected together for operation as a unit by a suitable connecting member 25, shown in Figure 7. A plurality of tool-supporting spindles 26 are supported in the cutter bar 22 and are adapted to be driven by suitable means next to be described.

Drive for tool-supporting spindles

An important feature of this invention resides in the novel drives provided for the spindles 26. These drives are so arranged that the belts of adjacent groups of spindles are constantly maintained under a uniform tension, regardless of the swinging movements of the cutter bar.

Each drive, as shown in Figure 1, comprises a belt 27 having a running connection with the pulleys 28 of a group of spindles 26, as clearly shown at the right hand side of Figure 1. A drive pulley 29 is shown secured directly to the shaft 31 of a suitable motor 32 mounted upon a supporting plate 33, which is suitably secured to a shaft 34, pivotally mounted in a bracket 35, adjustably secured to the tubular member 8 of the carriage by suitable bolts 36. The bracket 35 is shown comprising a cap 37 which cooperates with the bolts 36 to secure the bracket 35 in adjusted position upon the tubular member 8.

By reference to Figure 3, it will be noted that the motor is mounted for swinging movement about the vertical axis of the shaft 34, whereby it may swing towards or away from the tubular member 8, as indicated by the dotted lines in Figure 3, thereby to take up the slack in the belt 27. A suitable arm 38 is secured to one end of the shaft 34, and is shown extending in a rearward direction, as best illustrated in Figures 1 and 2. In Figure 1, the spindles are shown arranged in two groups, each group containing three spindles. It is also to be noted in this figure, that the motors 32 are oppositely arranged upon the carriage, whereby a single tension means, generally indicated by the numeral 39, may be used for constantly urging the drive pulleys 29 in a direction to maintain the belts 27 taut. The tension means 39 may consist of a suitable tension spring 41 having connections 42 connecting the ends thereof to the arms 38, whereby said arms are constantly urged towards one another, with the result that the motors, and therefore the drive pulleys 29, are constantly urged in a rearward direction, thereby to constantly maintain the belts under tension. It is also to be noted, by reference to Figure 1, that by thus connecting together the arms 38 of adjacent motor supports, the tension in adjacent belts 27 will be equalized at all times, which is desirable.

By pivotally supporting the motors, as above described, additional belt tightener pulleys are dispensed with, which lightens the carriage and reduces vibration, and makes it possible to operate the cutter bar 22 with less effort. The motors being mounted at the rear of the tubular member 8 of the carriage, counterbalance a portion of the weight of the cutter bar, as will readily be understood by reference to Figures 1 and 2. Additional counterbalancing means, however, may be provided, as indicated by the numeral 43, and may consist of rearwardly extending arms 44 suitably secured to certain of the arms 15 by bolts 45, and having counterweights 46 adjustably secured thereon. Suitable angle shaped brackets 40 are preferably secured to the tubular member 8 of the carriage adapted to engage the frame of the machine to limit the rearward tilting movement of the carriage. Stops 50 and 60 are also provided to limit the traveling movement of the carriage. See Figures 2 and 4.

By mounting the motors upon the tubular member 8 of the carriage, as above described, they may readily be adjusted longitudinally upon the member 8 to properly position the drive pulleys 29 thereof with respect to the spindles 26. Also by securing the motor supporting bracket 35 upon the tubular member, as described, these brackets may readily be detached from the carriage, when desired, to facilitate making repairs or for other purposes. The spindle supporting arms 15, because of being supported upon the member 8 of the carriage, as hereinbefore described, may be similarly adjusted upon the carriage with respect to one another, and without requiring any holes to be drilled in the member 8.

*Means for maintaining carriage parallel to table*

The means for maintaining the carriage parallel to the longitudinal centerline of the machine or the table, is best shown in Figures 1, 4, and 5, and comprises drums 47 suitably secured to the carriage supporting wheels 12. As these drums are alike in construction but one will be described in detail.

Metallic bands 48 and 49 each have one end suitably secured to the periphery of the drum 47 as, for example, by bolts 51, and whereby the terminals of the bands are spaced apart lengthwise of the drum, as shown by the dotted lines in Figure 1. The opposite ends of the bands 48 and 49 are adjustably secured to upright posts 52 and 53 provided at the front and rear ends of the machine frame, as best shown in Figures 1 and 4. By referring to Figure 1, it will be noted that the ends of the bands which are secured to the machine frame, are so arranged that the horizontal portions of the bands are disposed at a slight angle with respect to a line drawn at right angles through the axis of the member 8 of the carriage, whereby the bands wind onto and off the drums in the form of spirals and thus do not overlap on the peripheries of the drums, as will readily be understood by reference to Figure 1. In other words, by so arranging the bands, they will always be wound upon the drums in a single thickness, whereby the bands do not vary in length, as the carriage is moved forwardly and backwardly over the machine table in the operation of carving the work. By thus arranging the bands, the ends thereof may be fixedly secured to the machine frame without the use of tension means, which is usually necessary, when the convolutions of the bands are permitted to overlap, or to wind one upon another, on the peripheries of the drums which, obviously, causes the bands to elongate.

I have also found that by winding the bands onto and off the drum in the form of spirals, as above described, the travel of the carriage may be greatly increased, and the carriage will be positively maintained in parallel relation to the longitudinal centerline of the machine, regardless of the traveling movement thereon. It also makes it unnecessary to separate the carriage carrying wheels and drums, which is necessary when the bands are permitted to wind one upon the other.

*Track cleaning means*

Means is provided for cleaning the tracks 14 of foreign matter so as to cause the carriage wheels 12 to roll thereon without any obstructions. Such means is best shown in Figures 4 and 6, and consists of housings 54 which enclose the drums 47 and their complemental carriage wheels 12. These housings are slotted from their bottoms, as indicated at 55 and 56, whereby they may be fitted over the drums 47 and wheels 12, the slots 55 receiving the hubs 57 of the wheels 12, and the slots 56 the member 8, as best shown in Figure 5. To simplify construction, the inner side of the housing is supported directly upon the periphery of the tubular member 8 of the carriage, as indicated at 58 in Figure 5.

The opposite side of the housing is supported directly upon the track 14 by a pair of small wheels or rollers 59, rotatably mounted on rods 61, as shown in Figure 5.

Upon the rods 61 are pivotally mounted small plates 62 each having a suitable cleaning element 63 such, for example, as felt, secured to the under surface thereof, as best shown in Figure 6. These cleaning elements, in addition to cleaning the rails 14, are also adapted to engage the upper surfaces of the bands 48 and 49 with a wiping action, thereby to prevent the accumulation of dust and other foreign matter thereon so that the bands may be accurately wound upon the drums, and also whereby the wheels 12 may roll smoothly upon the tracks 14.

The guide wheels 59 on the rods 61 retain the housings in their upright position, as shown in Figure 4, when the carriage is moved backwardly and forwardly over the table, and, at the same time, the wiping elements 63 are moved over the surfaces of the bands and rails, as above stated, to thereby constantly clear them of all foreign matter. The housings 54 may readily be removed from the machine by simply removing the rods 59 and plate elements 62, as will readily be understood by reference to Figures 4 and 5.

It is to be noted, by reference to Figure 6, that the elements 63 are disposed at an incline, whereby they are held in contact with the upper surface of the bands 48 and 49 and the tracks 14, by gravity. The weight of the elements 63, including their supporting means 62 is such that the wiping elements are held in contact with the bands and tracks with sufficient pressure to remove all foreign matter therefrom which may tend to accumulate thereon during the operation of the machine.

In the drawings I have shown the carriage supporting member 8 as being supported upon wheels 12 at each end thereof. It is to be understood that if the machine is to be enlarged or in other words, lengthened in a direction lengthwise of the carriage supporting member 8 to increase the capacity thereof, it may be found necessary to provide a center support for the member 8 in order to prevent it from sagging, as a result of the weight of the supporting arms carried thereon. To thus support the center or intermediate portion of the supporting member 8, an auxiliary carrying wheel, not shown, may be provided thereon adapted to travel on a track similar to the tracks 14, shown at the ends of the machine, or some other suitable support may be provided.

Reversing mechanism

Another feature of the invention resides in the novel arrangement of the reversing mechanism for causing the sections 23 and 24 of the cutter bar 22 to move in opposite directions, as when carving right and left hand work. In the structure herein disclosed, the reversing mechanism is shown comprising a pair of segments 64 operatively connected together by metallic bands 65. The two bands are disposed in different horizontal planes, and each band has one end secured to one segment and its opposite end to the other segment, whereby the segments operate in opposite directions, or, in substantially the same manner as a pair of gear segments, the bands being so adjusted that there is no relative movement or slippage between the peripheries of the two segments, when they are oscillated about their pivots 66. In Figure 1, I have shown each segment operatively connected to an arm 15 of the carriage by suitable links 67.

The important feature of the structure resides in the fact that the segments 64 are not supported directly upon the arms 15, as is now customary. These segments, as clearly illustrated in Figure 1, are supported upon a bracket 68 which is suitably secured to the tubular member 8 of the carriage by such means as bolts 69, indicated in dotted lines in Figure 1.

By thus supporting the weight of the reversing mechanism directly upon the tubular member 8 of the carriage, the arms 15 are relieved of considerable weight, and also by connecting the reversing mechanism to the arms adjacent the cutter bar sections 23 and 24, or directly to the ends of said sections, the arms 15 are relieved of excessive strains which might otherwise be imparted thereto, were the reversing mechanism connected to the arms at points intermediate the ends thereof. The reversing mechanism may be quickly rendered inoperative by simply disconnecting the links 67 from the arms 15, as shown in Figure 7, and rigidly connecting together the sections 23 and 24 of the cutter bar by the connection 25, as hereinbefore stated.

Work supporting centers

Another feature of the invention resides in the construction of the work supporting centers at the front of the machine. These centers, generally indicated by the numeral 71, are alike in construction and therefore but one will be described in detail. As best shown in Figure 8, the center 71 which is commonly known as the "dead center", comprises a threaded spindle 72 having its forward end rotatably supported in a suitable sleeve bearing 73. A suitable hand grip or wheel 74 is secured to the front end of the spindle, whereby it may be conveniently rotated. The opposite end portion of the spindle is received in threaded engagement with a bushing 75, having an enlarged head 76 provided with a conical face 77 adapted to engage a correspondingly shaped seat or face 78, provided in a sleeve 79 supported in the longitudinal rail 3 at the front of the machine, as shown in Figures 2 and 8. This sleeve is suitably secured to the rail 3 by suitable means, not shown.

The bushing 75 has a plurality of axial slots 81 extending from the enlarged end thereof to a point short of the opposite end thereof, as best shown in Figure 8. A suitable key 82 is provided in the sleeve 79 and is received in one of the slots 81, thereby to prevent the bushing from relatively rotating with respect to the sleeve 79.

A cup-shaped center 83 is provided at one end of a plug 84, which has one end removably secured in a threaded socket 85, provided in the end of the spindle 72. The plug 84 has a conical portion 86 adapted to engage a correspondingly shaped seat 87 in the spindle 72, thereby to positively center the plug 84 with respect to the spindle.

A pin 88, having a pointed terminal 89, is slidably mounted in a bore in the plug 84 and has an enlarged head 91 normally engaged with the inner end of the plug 84, as shown in Figure 8. A suitable spring 92 is mounted in a cylindrical bore 93 in the spindle and has one end engaging the bottom of said bore, and its opposite end engaging the head of the pin 89, thereby to normally retain the pin 88 in the position shown in Figure 8. The spring permits the pin 88 to be moved longitudinally in the plug 84, when a piece of work is thrust thereagainst.

To secure a piece of work between the center 71 and the live center 94 provided at the rear of the machine, one end of the work is engaged with the live center 94 and the opposite end thereof is then alined with the dead center 71. The operator then grasps the hand grip 74, and relatively rotates the spindle 72, whereby the cup-shaped terminal 83 of the plug 84 is forced into engagement with the end of the work, and, at the same time, the opposite end of the work is forced into engagement with the drive center 94. It is to be understood that the spindle 72 is slidable in the guide bearing 73, and the bushing 75 is slidable within the sleeve 79.

By constructing the dead center, as above described, the cup-shaped terminal 83 will always be axially alined with the spindle 72, primarily, because of the conical head 76 engaging the conical seat 78 of the sleeve 79. Also, because of the bushing 75 being slit, as shown in Figure 9, when the spindle is rotated to drive the cup-shaped terminal thereof of the center 71 into the work, the thrust imparted to the bushing 75 will tend to contract it because of the tapered seat 78, whereby the dead center 71 becomes self-centering, which is important in structures of this general character.

The cup-shaped terminal 83 of the center 71 may readily be removed from the spindle for repairs or other purposes, as will readily be understood by reference to Figure 8, the plug 84 being provided with suitable flat faces, whereby the plug may be rotated with respect to the spindle to screw it into or out of engagement therewith.

The drive for the live center 94 is best shown in Figure 2, and comprises a shaft 80 having a worm 90 meshing with a worm gear 100, secured to the spindle 112 of the live center. A suitable container 113 is disposed below the worm 90, and is adapted to contain a suitable lubricant for lubricating the worm 90 and gear 100.

Operation

The machine is operated in substantially the same manner as an ordinary wood carving machine. In Figure 1, it will be noted that the section 24 of the cutter bar 22 is relatively longer than the section 23, whereby a suitable follower pin, not shown, may be secured thereto at the point indicated at 95 in Figure 1. This follower is adapted to follow the contour of the usual pattern, whereby the cutting tools in the spindles will carve the work to correspond to the contour of the pattern, in the usual manner.

In the drawings, I have shown a simple tension means 39 for taking up slack in the drive belts 27 of the spindles, whereby the tension in said belts is equalized. It is to be understood, however, that if desired, each motor may be provided with an independent spring for urging it in a direction to tighten the belt. When thus actuated, however, care should be exercised to adjust the drive belts to substantially the same tension.

In Figure 1, I have shown a pair of spring elements 96, each having one end suitably secured to the tubular member 8 of the carriage and their opposite ends to a rearwardly extending arm 44, similar to the one shown at the right and left hand ends of Figure 1. These spring elements 96 act to center the arms 15 of the carriage, so that when the arms are swung in a direction lengthwise of the carriage, the springs 96 constantly tend to return them to their normal positions, shown in Figure 1.

Figure 11:
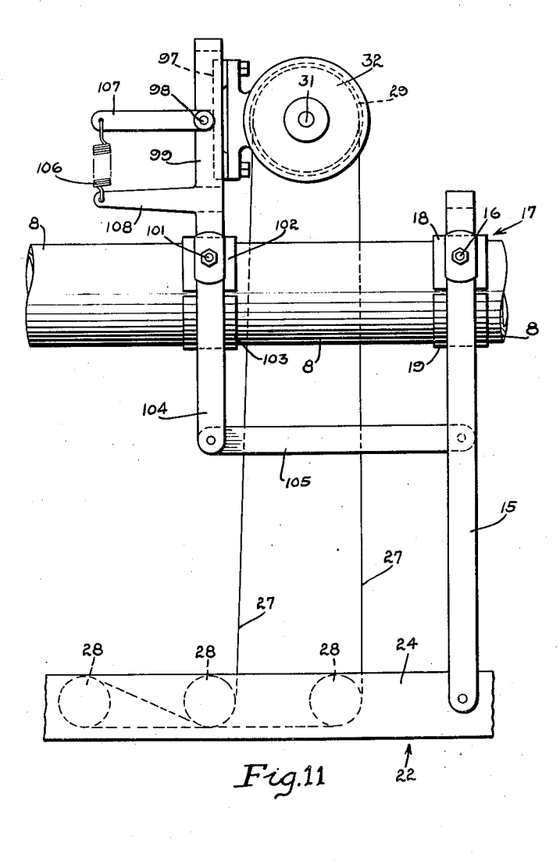
Figure 11 is a view showing a belt drive in in which the motor is pivotally mounted upon a bracket which, in turn, is pivotally supported upon the carriage.
Figure 12:
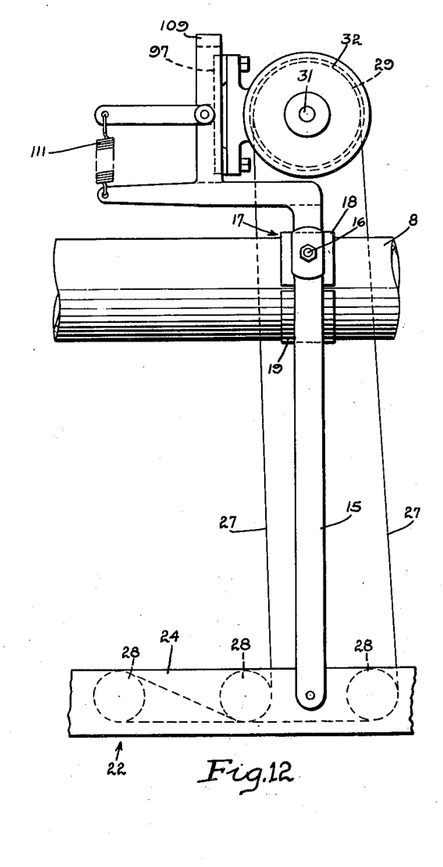
Figure 12 is a view showing a belt drive in which the motor is pivotally supported directly upon one of the cutter bar supporting arms.

In Figures 11 and 12, I have shown belt drives of slightly modified constructions, but in which the motors are pivotally supported in substantially the same manner as shown and described with reference to the previous figures.

In the construction shown in Figure 11, the motor 32 is shown mounted on a supporting plate 97 which is secured to a shaft 98, rotatably supported in a bracket 99 mounted for pivotal movement upon the tubular member 8 of the carriage by suitable pivots 101. The pivots 101 are supported upon the tubular member 8 by suitable clamping members 102 and 103. The bracket 99 has a forwardly extending arm 104, to which one end of a connecting rod 105 is connected, the opposite end of which is connected to the arm 15. By thus connecting the arm 104 to the arm 15, when the latter is oscillated about its pivots 16, the motor bracket 99 is also oscillated in a direction lengthwise of the carriage.

The motor and drive pulley 29 thereof are constantly urged in a rearward direction by the action of a spring 106 having one end connected to an arm 107 which is secured to the shaft 98. The opposite end of the arm 107 is suitably connected to an extension 108 of the bracket 99.

In the form shown in Figure 12, the supporting plate 97 of the motor 32 is pivotally supported upon a rearward extension 109 of the arm 15, whereby the motor is supported directly upon and is movable with said arm. The motor 32 and drive pulley 29 are constantly urged in a rearward direction by a spring 111, similar to the spring 106 in Figure 11, which constantly acts to maintain the drive belt at the proper tension.

I claim as my invention:

1. In a carving machine, a work supporting table, a carriage including a plurality of arms mounted for swinging movement thereon in a direction lengthwise thereof, a tool supporting bar supported at the other ends of said arms and comprising a plurality of tool supporting spindles which spindles are arranged in groups, a belt drive for each group of spindles, each including a belt and a motor, supports for said motors mounted for pivotal movement in a horizontal plane on the carriage and independently of said arms, a single tension element connecting together adjacent supports and constantly urging them in directions to maintain their respective belts taut, regardless of the positions of the arms and carriage, said tension element serving as the sole means for maintaining said belts taut.

2. In a carving machine, a work supporting table, a carriage including a plurality of arms mounted for swinging movement thereon in a direction lengthwise of the table, a plurality of tool supporting spindles carried by the arms and arranged in two groups, means for driving said spindles, and a reversing mechanism supported directly on the carriage independently of said arms and operatively connected to the arms whereby said groups of spindles will operate in opposite directions lengthwise of the carriage to permit right and left hand objects to be carved simultaneously.

3. In a wood carving machine, a work supporting table, a carriage including a supporting member mounted for traveling movement over the table, a plurality of arms pivotally supported on said member and adapted for swinging movement lengthwise thereof, said arms being arranged in groups and each group supporting a tool supporting bar, and a reversing mechanism operatively connected with said bars and supported directly on said member, thereby to minimize the strain transmitted to the arms when operated, said reversing mechanism causing said tool supporting bars to operate in opposite directions lengthwise of the carriage to permit right and left hand objects to be carved simultaneously.

4. In a carving machine, a work supporting table, a carriage including a member mounted for movement over the table and having a plurality of arms mounted for pivotal movement thereon in a direction lengthwise of the table, said arms being arranged in groups, and each group comprising a tool supporting bar, a plurality of tool supporting spindles mounted in each bar, means for driving said spindles, and a reversing mechanism supported directly on said member and independent of said arms and including pivoted segments operatively connected together for simultaneous movement, and each segment having an operative connection with a tool supporting bar, thereby to cause said bars to operate in opposite directions lengthwise of the carriage to facilitate carving right and left hand objects.

5. In a carving machine, a work supporting table, a carriage mounted for movement thereover and comprising a plurality of arms mounted for pivotal movement thereon in a direction lengthwise thereof, said arms being arranged in groups, and each group comprising a tool supporting bar, a plurality of tool supporting spindles on each bar, means for driving said spindles and a reversing mechanism disposed in proximity to the adjacent ends of said tool supporting bars and supported directly on the carriage and independently of said arms, said reversing mechanism comprising pivoted segments operatively connected together by flexible bands and adapted for simultaneous movement in opposite directions, and each segment having an operative connection with one of said tool supporting bars, whereby said bars will operate in opposite directions lengthwise of the carriage, thereby to facilitate carving right and left hand objects.

6. In a carving machine, a work supporting table, a track, a carriage having a wheel mounted to travel on said track, a drum secured to the wheel, and metallic bands or tapes each having one end secured to the periphery of the drum and their opposite ends fixed to points adjacent the ends of the track, and said bands being disposed at an incline to the line of travel of the drum, whereby when the carriage is moved backwardly and forwardly over the table, said bands are wound onto and off the drum in opposite directions, and in non-lapping relation, whereby the carriage is maintained in parallel relation to the longitudinal centerline of the machine.

7. In a carving machine, a work supporting table, a track, a carriage having a wheel mounted to travel on said track, a drum secured to the wheel, and a pair of metallic bands each having one end secured to the periphery of the drum and having their opposite ends fixedly secured at points adjacent the ends of the track in such manner that the tapes are wound on and off the drums in opposite directions and in the form of spirals, thereby to prevent overlapping of the bands on the periphery of the drum, when the latter is rotated a complete revolution or more, and whereby said bands maintain the carriage parallel to the longitudinal centerline of the table, regardless of its traveling movement thereover.

8. In a carving machine, a work supporting table, a track at each end thereof, a carriage having a wheel at each end adapted to travel on said tracks, a drum secured to each wheel, and a pair of metallic bands secured to the periphery of each drum and to fixed points adjacent the ends of the tracks in angular relation to the line of travel of said drums, whereby the bands are wound on and off the drums in the form of spirals, thereby to prevent overlapping of the bands on the peripheries of the drums, when the latter are rotated a complete revolution or more, and whereby said drums maintain the axis of the carriage parallel to the longitudinal centerline of the table, regardless of the traveling movement of the carriage over the table.

9. In a carving machine, a work supporting table, a track at each end thereof, a carriage having wheels for traveling on said tracks, a drum secured to each wheel, flexible elements coiled about said drums and having ends fixedly secured at points adjacent the ends of the tracks, a housing enclosing each drum and having guide wheels in the lower portion thereof engaging the tracks to retain the housings in proper positions, and plate elements pivotally mounted in the lower portions of said housings at the front and rear of the carriage wheels, and carrying wiper elements which constantly engage the upper surfaces of said tracks and said flexible elements, thereby to prevent the accumulation of foreign matter thereon, when the machine is in operation.

10. In a wood carving machine, a carriage comprising an elongated supporting member, a plurality of brackets clampingly secured to said member and adapted for axial and rotary adjustments thereon, and an arm pivotally mounted on each bracket and supporting at their outer ends a plurality of tool-supporting spindles, said brackets being secured to the elongated member without requiring any holes to be drilled therein, and providing means whereby the arms may be accurately spaced apart and alined with one another.

11. In a wood carving machine, a carriage comprising an elongated supporting member, a plurality of brackets secured to said member, means whereby said brackets are adapted for rotary and axial adjustments on the member, and an arm pivotally mounted on each bracket and supporting at their outer ends a plurality of tool supporting spindles, said brackets providing means whereby the arms may be accurately spaced apart and alined with one another upon the supporting member.

12. In a machine of the character described, a support, an arm movable with respect to said support, a rotary spindle carried by and movable with said arm, a motor pivotally mounted on said support, a single endless belt operating in a substantially horizontal plane inter-connecting said motor and said spindle, and means constantly urging said motor in a direction in said horizontal plane to maintain said belt taut, said means serving as the sole means for maintaining said belt taut.

13. In a machine of the character described, a support, an arm movable with respect to said support, a rotary spindle carried by and movable with said arm, a motor carried by and pivotally mounted on said support, a single endless belt operating in a substantially horizontal plane inter-connecting said motor and said spindle, and resilient means for constantly urging said motor in a direction in said horizontal plane to maintain said belt taut, said resilient means serving as the sole means for maintaining said belt taut.

14. In a machine of the character described, a support, an arm movable with respect to said support, a plurality of rotary spindles carried by and movable with said arm, a motor carried by and pivotally mounted on said support, a single endless belt operating in a substantially horizontal plane inter-connecting said motor and each of said spindles, and resilient means for constantly urging said motor in a direction in said horizontal plane to maintain said belt taut, said resilient means serving as the sole means for maintaining said belt taut.

15. In a machine of the character described, a work supporting table, a carriage movable with respect to said table, a supporting element on said carriage, an arm pivotally connected to said supporting element, a plurality of rotary spindles carried by and movable with said arm, a motor carried by and pivotally mounted on said supporting element, a single endless belt operating in a substantially horizontal plane inter-connecting said motor and each of said spindles, and a spring connected to said motor and tensioned to constantly urge said motor in a direction in said horizontal plane and about its pivot to maintain said belt taut, said spring serving as the sole means for maintaining said belt taut.

16. In a carving machine, a work supporting table, a carriage including a plurality of arms mounted for swinging movement in a direction lengthwise thereof, a tool supporting bar supported at the outer ends of said arms and comprising a plurality of tool supporting spindles, a motor pivotally mounted on said carriage, a single endless belt inter-connecting said motor and each of said spindles, and means constantly urging said motor in a direction in the plane of said belt and about its pivot to maintain said belt taut, said means serving as the sole means for maintaining said belt taut.

17. In a carving machine, a work supporting table, a carriage including a plurality of arms mounted for pivotal movement thereon in a direction lengthwise thereof, a tool supporting bar pivoted to the outer ends of said arms, a plurality of tool supporting spindles mounted in said bar, a drive for said spindles comprising a single endless belt and a motor for driving the same, a support for said motor mounted for swinging movement about a vertical axis to permit the motor to move toward or from said tool supporting bar in a horizontal plane, and means constantly urging said support and motor about said vertical axis in a direction in said horizontal plane to tighten said belt, regardless of the positions of the arms and carriage, said means serving as the sole means for maintaining said belt taut.

JOHN GALBRAITH.